United States Patent
Bender et al.

(10) Patent No.: US 10,184,514 B2
(45) Date of Patent: Jan. 22, 2019

(54) BEARING ISOLATOR SEAL WITH ENHANCED ROTOR DRIVE COUPLING

(71) Applicant: Flowserve Management Company, Irving, TX (US)

(72) Inventors: Robert Paul Bender, Bettendorf, IA (US); Jason C Ferris, Plainwell, MI (US); William Eric Meyer, Jr., East Leroy, MI (US); Joseph Charles Barker, Delton, MI (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 15/533,114

(22) PCT Filed: Dec. 18, 2015

(86) PCT No.: PCT/US2015/066578
§ 371 (c)(1),
(2) Date: Jun. 5, 2017

(87) PCT Pub. No.: WO2016/100771
PCT Pub. Date: Jun. 23, 2016

(65) Prior Publication Data
US 2017/0370405 A1    Dec. 28, 2017

Related U.S. Application Data

(60) Provisional application No. 62/093,856, filed on Dec. 18, 2014.

(51) Int. Cl.
*F16J 15/32*    (2016.01)
*F16C 19/06*    (2006.01)
(Continued)

(52) U.S. Cl.
CPC ............ *F16C 19/06* (2013.01); *F16C 33/768* (2013.01); *F16C 33/7886* (2013.01);
(Continued)

(58) Field of Classification Search
CPC .... F16C 19/06; F16C 33/768; F16C 33/7886; F16C 33/80; F16J 15/164; F16J 15/3244; F16J 15/42; F16J 15/4478
See application file for complete search history.

(56) References Cited

U.S. PATENT DOCUMENTS 4,743,034 A    5/1988  Kakabaker et al.
4,989,883 A *  2/1991  Orlowski ............... F16J 15/008
                                                277/303

(Continued)

FOREIGN PATENT DOCUMENTS

EP    0489604 A1    6/1992
JP    H07-004441 A  1/1995

OTHER PUBLICATIONS

PCT Search Report for PCT Application No. PCT/US2015/066578, dated Mar. 21, 2016, 13 pages.

(Continued)

*Primary Examiner* — Gilbert Y Lee
(74) *Attorney, Agent, or Firm* — Maine Cernota & Rardin (57) ABSTRACT

A bearing isolator seal provides enhanced coupling and stability of the rotor to the shaft, without undue seal enlargement, by including a plurality of drive O-rings in a common retention groove. In embodiments, the isolator seal accommodates axial rotor misalignment up to a maximum permitted axial misalignment, which can be at least 0.025". Embodiments include a labyrinth passage between the rotor and the stator configured to expel fluid by centrifugal force. Embodiments include a shut off feature that takes advantage of axial misalignment. Some embodiments include a unit- (Continued)

ization feature that holds the rotor and stator together during assembly. The unitization feature can include chamfers on rotor and stator extensions that facilitate assembly and disassembly when sufficient force is applied.

9 Claims, 7 Drawing Sheets (51) Int. Cl.
*F16J 15/16* (2006.01)
*F16J 15/447* (2006.01)
*F16C 33/76* (2006.01)
*F16C 33/78* (2006.01)
*F16J 15/3244* (2016.01)
*F16C 33/80* (2006.01)
*F16J 15/42* (2006.01)

(52) U.S. Cl.
CPC ......... *F16J 15/164* (2013.01); *F16J 15/3244* (2013.01); *F16J 15/4478* (2013.01); *F16C 33/80* (2013.01); *F16J 15/42* (2013.01)

(56) References Cited

U.S. PATENT DOCUMENTS

| | | | | |
|---|---|---|---|---|
| 5,069,461 A | * | 12/1991 | Orlowski | F16J 15/008 |
| | | | | 277/303 |
| 5,221,095 A | | 6/1993 | Orlowski | |
| 5,378,000 A | * | 1/1995 | Orlowski | F16J 15/164 |
| | | | | 277/311 |
| 5,957,462 A | | 9/1999 | Nishiyama et al. | |
| 6,062,568 A | | 5/2000 | Orlowski et al. | |
| 6,311,984 B1 | * | 11/2001 | Orlowski | F16J 15/004 |
| | | | | 277/412 |
| 6,583,376 B2 | * | 6/2003 | Kobayashi | B23H 7/02 |
| | | | | 219/69.12 |
| 7,052,014 B1 | | 5/2006 | Orlowski et al. | |
| 9,831,739 B2 | * | 11/2017 | Tejano | H02K 5/136 |
| 2001/0025831 A1 | | 10/2001 | Kobayashi | |
| 2002/0167131 A1 | * | 11/2002 | Orlowski | F16J 15/4478 |
| | | | | 277/371 |
| 2007/0029736 A1 | * | 2/2007 | Roddis | F16J 15/4478 |
| | | | | 277/345 |
| 2007/0138748 A1 | * | 6/2007 | Orlowski | F16J 15/4478 |
| | | | | 277/412 |
| 2008/0063330 A1 | * | 3/2008 | Orlowski | B65G 39/09 |
| | | | | 384/448 |
| 2011/0101618 A1 | | 5/2011 | Orlowski et al. | |
| 2011/0204734 A1 | | 8/2011 | Orlowski et al. | |
| 2014/0183998 A1 | * | 7/2014 | Hoehle | H01R 39/12 |
| | | | | 310/88 |
| 2014/0333031 A1 | | 11/2014 | Tones et al. | |
| 2015/0198252 A1 | * | 7/2015 | Jason | F16J 15/3404 |
| | | | | 277/408 |
| 2016/0208857 A1 | * | 7/2016 | Rea | F16C 33/80 |

OTHER PUBLICATIONS

PCT Search Report for PCT Application No. PCT/US2015/064422, dated Mar. 12, 2016, 10 pages.
International Preliminary Report on Patentability of PCT Application PCT/US2015/064422, dated 170613, 7 pages.
Extended European Search Report of European Application No. EP15871142.4 dated Jul. 9, 2018, 5 pages.

* cited by examiner

BEARING ISOLATOR SEAL WITH ENHANCED ROTOR DRIVE COUPLING

RELATED APPLICATIONS

This application is a national phase application filed under 35 USC § 371 of PCT Application No. PCT/US2015/066578 with an International filing date of Dec. 18, 2015 which claims the benefit of U.S. Provisional Application No. 62/093,856, filed Dec. 18,2014. Each of these applications is herein incorporated by reference in its entirety for all purposes.

FIELD OF THE INVENTION

The invention relates to bearing isolator seals, and more particularly, to bearing isolator seals that include a rotor coupled to a drive shaft.

BACKGROUND OF THE INVENTION

Bearing isolator seals are commonly used in a variety of rotating shaft applications when it is necessary to exclude contaminants or process fluid from reaching internal mechanisms such as shaft support bearings, or from leaking out of a housing that is penetrated by the rotating shaft.

For example, bearing isolator seals are used in bearing housings for pumps, motors, gearboxes and other pieces of rotating equipment. The main purpose of a bearing isolator seal is to prevent the ingress of process fluid or other contaminants into the bearing, which can lead to premature failure of the lubrication and bearings. In fact, penetration by contaminants is the most common reason for rotating equipment failure.

For many applications, lip seals and simple labyrinths have proven inadequate for preventing ingress of contamination into bearings. In many cases, the use of bearing isolator seals can extend rotating equipment lifespans by a factor of 2 to 5, as compared to the typical equipment lifespans when standard lip seals or simple labyrinths are used.

Bearing isolators use a stator in close proximity to a dynamic rotor to prevent the ingress of contamination. Rotors are typically driven by the rotating shaft, and are usually coupled to the shaft by a drive O-ring that transmits torque from the shaft to the rotor. The grip of the drive O-ring is critical to the stability of the rotor, and to the performance of the bearing isolator.

Figure 1:
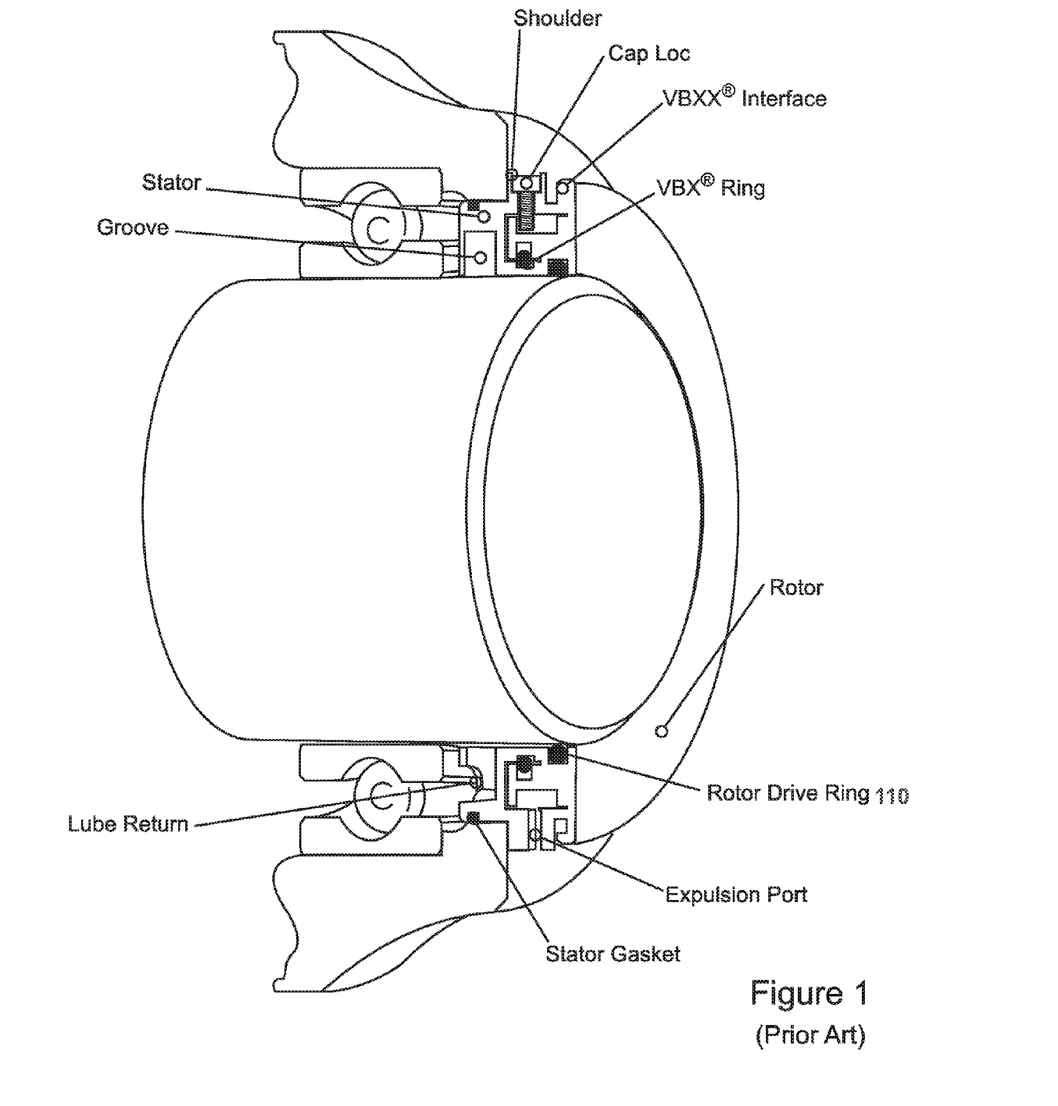
FIG. 1 is a perspective view of a bearing isolator seal of the prior art that includes a single drive O-ring.

Due to a need for compactness, among other considerations, most bearing isolators use a single drive O-ring in a single groove to couple the rotor to the shaft. An example of this approach is shown in FIG. 1, which includes a single rotor drive ring 100. However, for some applications this approach does not provide sufficient rotor stability and performance. In particular, a single drive O-ring may fail to maintain the alignment of the rotor with the stator to within acceptable tolerances for some applications.

Figure 2:
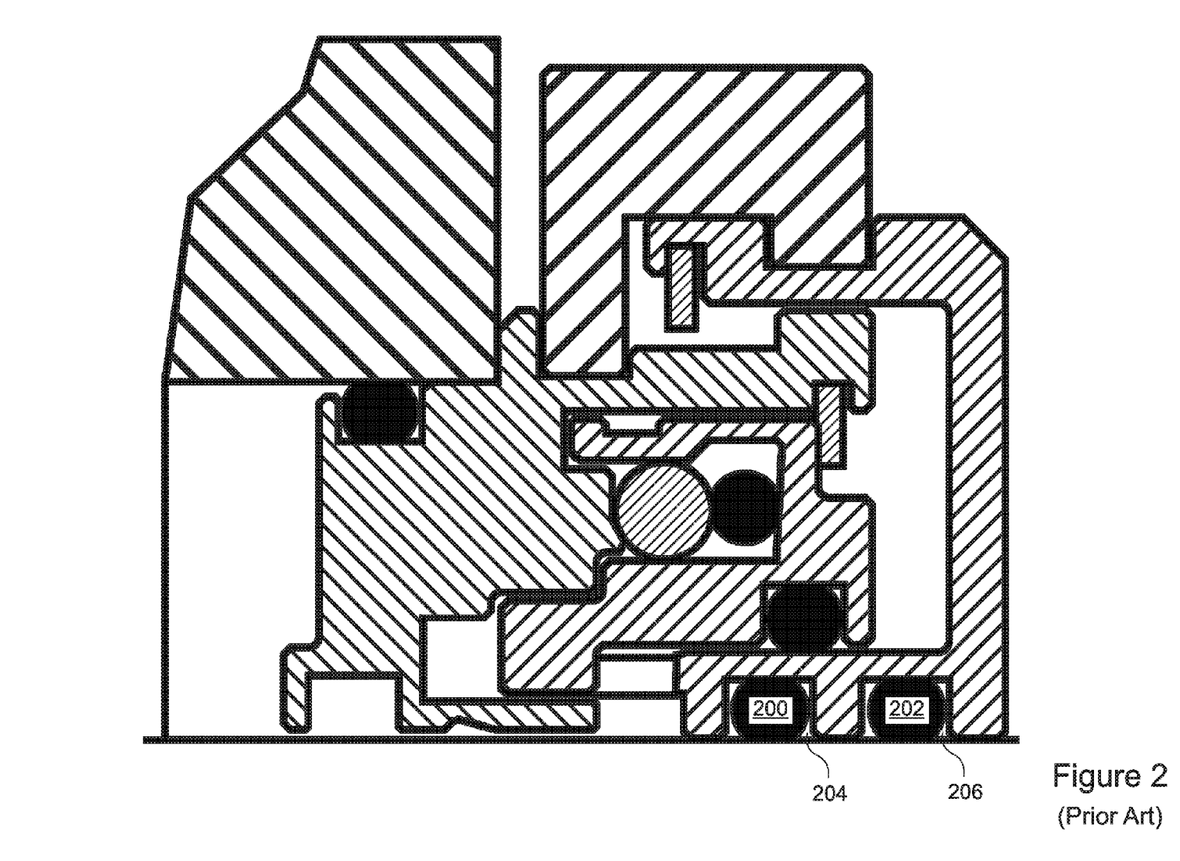
FIG. 2 is a cross-sectional view of a bearing isolator seal of the prior art that includes two drive O-rings in separate retention grooves.

With reference to FIG. 2, some bearing isolators include 2 drive O-rings 200, 202 in two separate grooves 204, 206. This approach can provide better rotor alignment, stability and performance than a single drive O-ring, but significant elongation of the rotor is required to accommodate the two drive O-rings and grooves. Accordingly, this approach may not be suitable for applications that require a compact solution.

What is needed, therefore, is a bearing isolator seal that provides enhanced shaft grip and rotor alignment stability without undue loss of compactness.

SUMMARY OF THE INVENTION

A bearing isolator seal provides enhanced coupling and stability of the rotor to the shaft, without undue loss of compactness, by providing at least two drive O-rings in a common retention groove. This approach provides grip strength and stability comparable to multiple-groove solutions, but in a smaller dimensional envelope.

Before the present invention, it was believed that placing two O-rings into a common groove would problematic, especially during installation, because the two O-rings might interfere with each other, resulting in O-ring hysteresis or some other form of O-ring misalignment. However, it was found that with use of an appropriate O-ring lubricant these problems could be avoided.

Some embodiments take advantage of axial rotor misalignment to enhance a static shut off feature based on a shut off O-ring by including a tapered section in the interface between the rotor and stator, adjacent to the shut off O-ring.

In various embodiments, the bearing isolator can accommodate an axial misalignment of up to 0.025".

Various embodiments include a unitization feature that holds the rotor and stator together during assembly. In some of these embodiments, the unitization feature provides an interference fit between a groove at the outer diameter of the rotor and a notch on the inner diameter of the stator. Chamfers on both the notch and the groove facilitate both assembly and disassembly when sufficient force is applied, while maintaining the unitization of the rotor and stator during assembly and operation. And in some of these embodiments, the unitization feature also acts as an additional torturous path to restrict contaminant flow.

The present invention is a bearing isolator seal that includes a rotor surrounding a rotatable shaft, said rotatable shaft being configured to rotate about a rotation axis, a drive retention groove formed in an inward facing surface of the rotor abutting the shaft, a plurality of drive O-rings contained in the drive retention groove and compressed between the shaft and a top of the drive retention groove, the drive O-rings thereby rotationally coupling the rotor to the shaft, and a stator surrounding the shaft and configured to remain stationary when the rotor is rotating, the rotor and stator being configured to inhibit a flow of fluid between them.

In embodiments, a maximum permitted axial movement is at least 0.010 inches. Certain embodiments further include a labyrinth passage between the rotor and the stator, the labyrinth passage being configured to expel at least one of fluid and particles from the labyrinth passage by centrifugal force when the rotor is rotating.

Some embodiments further include a shut off retention groove formed in an inward-facing surface of the rotor abutting an extension of the stator, and a shut off O-ring expandably located within the shut off retention groove and configured to rotate with the rotor, the shut off O-ring having an inner diameter that contracts against the stator extension when the rotor is stationary, and expands away from contact with the stator extension when the rotor is rotating.

In various embodiments, the stator extension includes a tapered section that is configured such that interference between the tapered section and the shut off O-ring declines linearly as the rotor moves axially away from the stator. And in some of these embodiments the tapered section is tapered at an angle of between two degrees and thirty degrees from the rotation axis.

Certain embodiments further include a unitization feature that is configured to permit separation and combination of the rotor with the stator when sufficient force is applied, while holding the rotor and stator together during assembly of the static seal. In some of these embodiments, the unitization feature includes a chamfered rotor extension and a chamfered stator extension, the rotor and stator extensions being configured to come into contact with each other when the rotor is shifted axially to a maximum permitted axial misalignment, and to thereby inhibit further axial movement of the rotor. And in some of these embodiments the unitization feature provides an additional torturous path to further inhibit the flow of fluid between the rotor and the stator.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 3A:
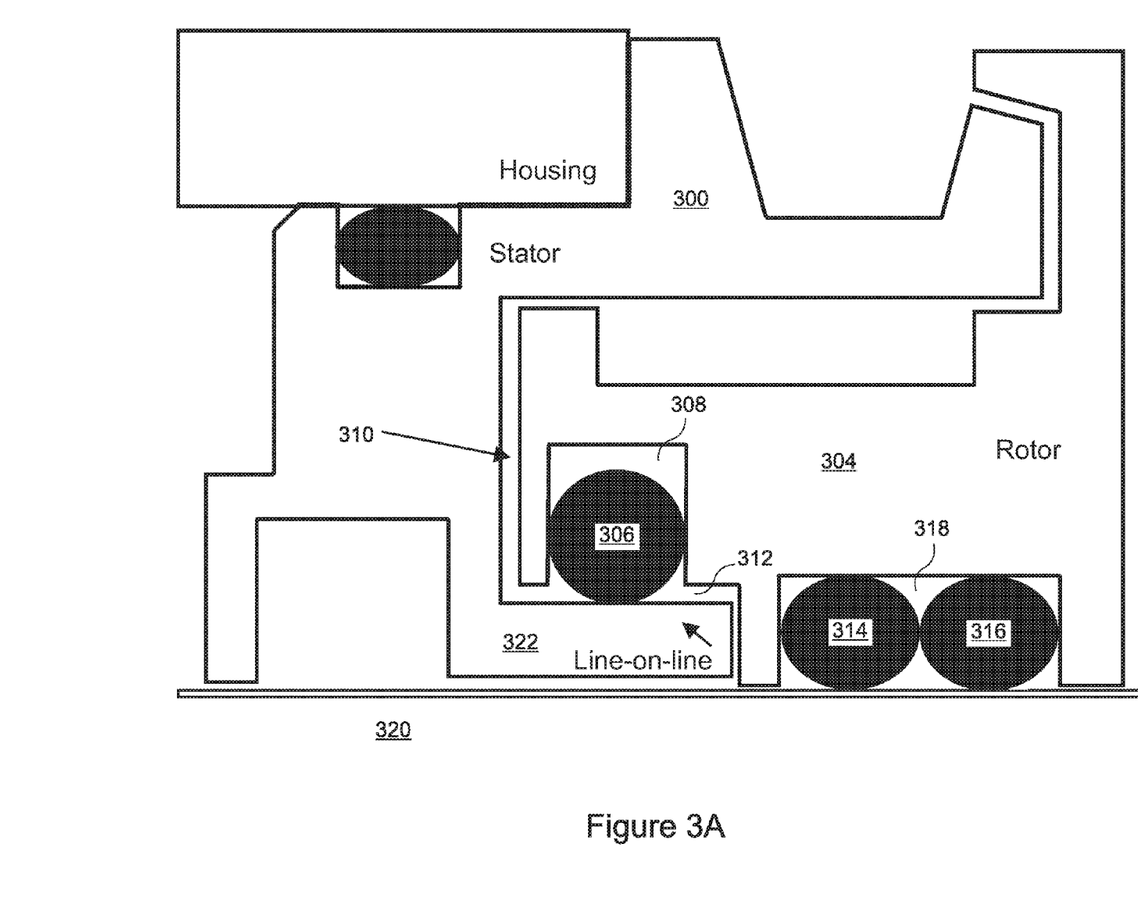
FIG. 3A is a cross-sectional view of an embodiment of the present invention.

With reference to FIG. 3A, the present invention is a bearing isolator seal that provides enhanced rotor shaft coupling and stability, without undue loss of compactness, by providing at least two drive O-rings 314, 316 in a common retention groove 318. This approach provides grip strength and rotor/shaft alignment stability that is comparable to multiple-groove solutions (see FIG. 2), but in a smaller dimensional envelope.

The embodiment illustrated in FIG. 3A further includes a static shut off feature that seals the air gap 310 between the rotor 304 and the stator 300 when the equipment is not running. The shut off feature includes a shut off O-ring 306 that rotates with the rotor 304 and surrounds an extension 322 of the stator 300. When the rotor 304 is rotating, the shut off O-ring 306 is expanded by centrifugal force away from the stator extension 322 and into a space provided above the shut off O-ring 306 in the shut off retention groove 308, so that the shut off O-ring 306 does not interfere with rotation of the rotor 304 relative to the stator 300. But when the rotor 304 is static, as is shown in FIG. 3A, the shut off O-ring 306 contracts and seals against the stator extension 322, so as to seal the gap between the rotor 304 and the stator 300.

In embodiments, the bearing isolator seal also includes labyrinth technology 310 that further enhances the exclusion of contaminants. In the embodiment of FIG. 3A, a close radial clearance 312 is maintained between the rotor 304 and stator extension 322 to maximize the effectiveness of the labyrinth technology 310.

Figure 3B:
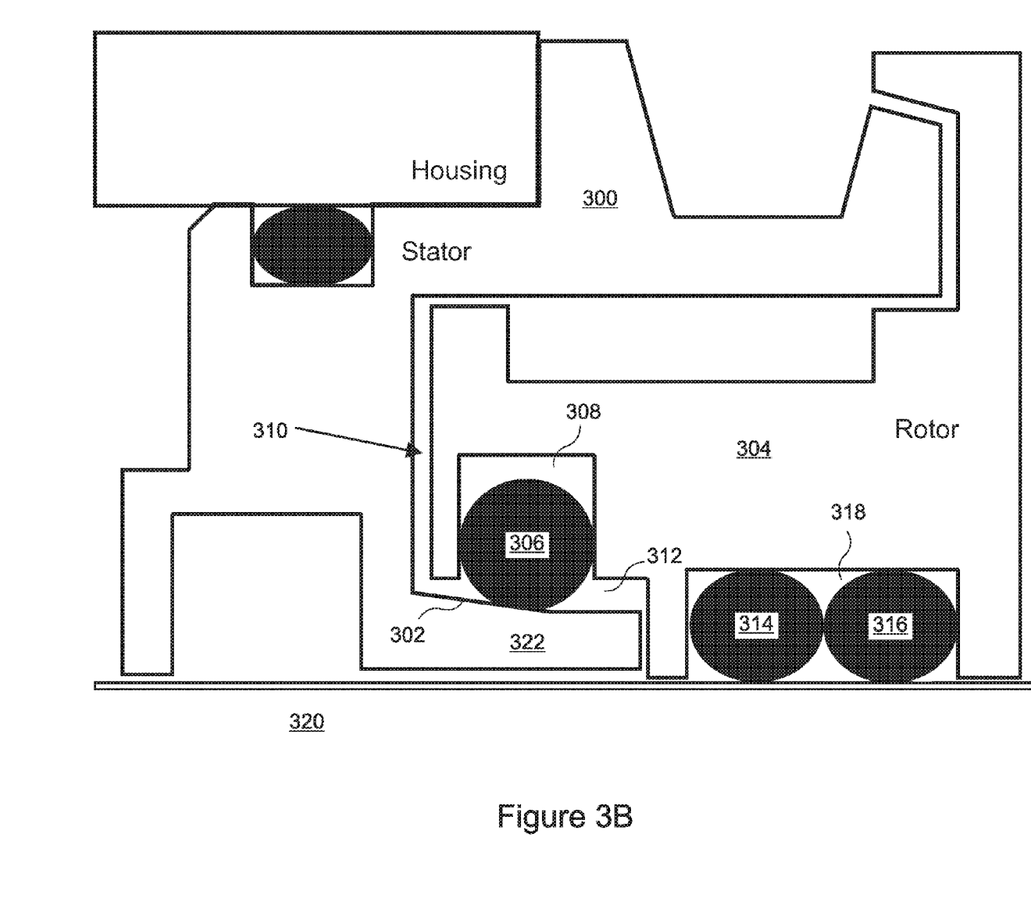
FIG. 3B is a cross-sectional view of an embodiment similar to FIG. 3A, but adapted to accommodate and take advantage of axial misalignment, where the embodiment is shown without any axial misalignment.

FIG. 3B is a cross-sectional illustration of an embodiment similar to FIG. 3A, except that the embodiment of FIG. 3B accommodates and takes advantage of rotor misalignment. In this embodiment, the stator 300 of the bearing isolator seal includes a tapered section 302 located in an inboard region of the stator extension 322, adjacent to the shut off O-ring 306. Because FIG. 3B is a cross-sectional illustration, the tapered section 302 appears as in inclined section. When the rotor 304 is static, and there is no axial misalignment between the rotor 304 and the stator 300, the shut off O-ring's nominal inside diameter is pressed against the tapered section 302 of the stator 300, forming an enhanced static seal. The angle of the tapered section 302 is toward the rotor 304, which biases the shut off O-ring 306 against the shut off O-ring's containment groove 308 on the rotor 304, enabling the static seal when no misalignment is present.

When the rotor 304 is rotating and is axially separated from the stator 300 due to axial misalignment, the interference of the shut off O-ring's nominal inside diameter with the tapered section 302 is reduced. And when the maximum permitted axial misalignment is reached, (see FIG. 4B, described in more detail below), the interference between the shut off O-ring's inner diameter and the stator 300 becomes a "line on line" fit, thereby maintaining static shut off capability throughout the axial misalignment range. On the other hand, when the rotor is static and in its static axial location, as illustrated in FIG. 3B, the interference of the shut off O-ring's nominal inside diameter with the tapered section 302 is increased, as the shut off O-ring 306 is shifted closer to the tapered section 302 of the stator 300.

Figure 4A:
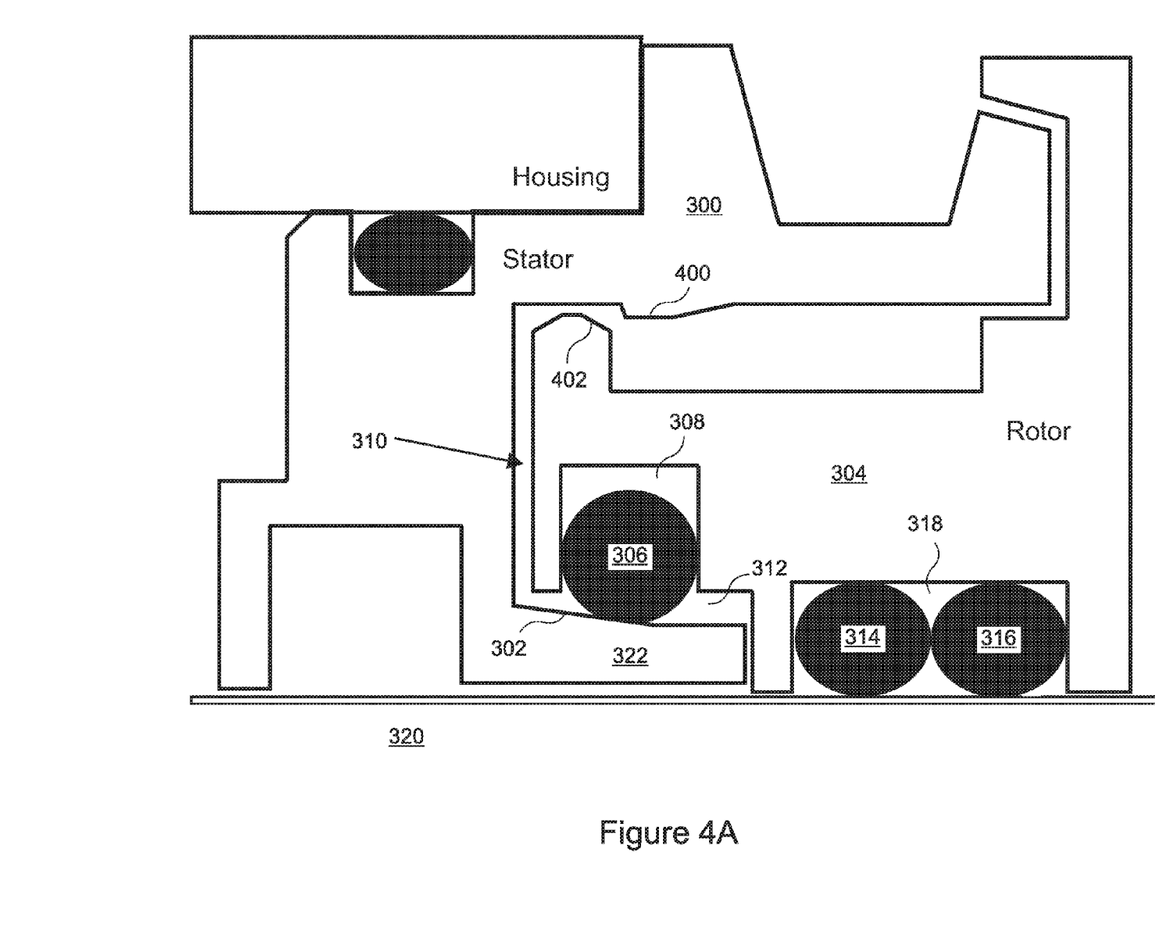
FIG. 4A is a cross-sectional view of an embodiment similar to FIG. 3B, but including a unitization feature, where the embodiment is shown without any axial misalignment.

FIG. 4A is a cross-sectional illustration of an embodiment similar to FIG. 3B, except that it also includes a unitization feature that holds the rotor 304 and stator 300 together during assembly and operation. In the embodiment of FIG. 4A, the unitization feature provides an interference fit between a groove 402 at the outer diameter of the rotor 304 and a notch 400 on the inner diameter of the stator 300. Chamfers on both the notch 400 and the groove 402 facilitate both assembly and disassembly when sufficient force is applied, while maintaining the unitization of the rotor 304 and stator 300 during assembly. And in the illustrated embodiment, the unitization feature also acts as an additional torturous path to restrict contaminant flow. In FIG. 4A, the rotor 304 is illustrated in its fully aligned, at-rest position.

Figure 4B:
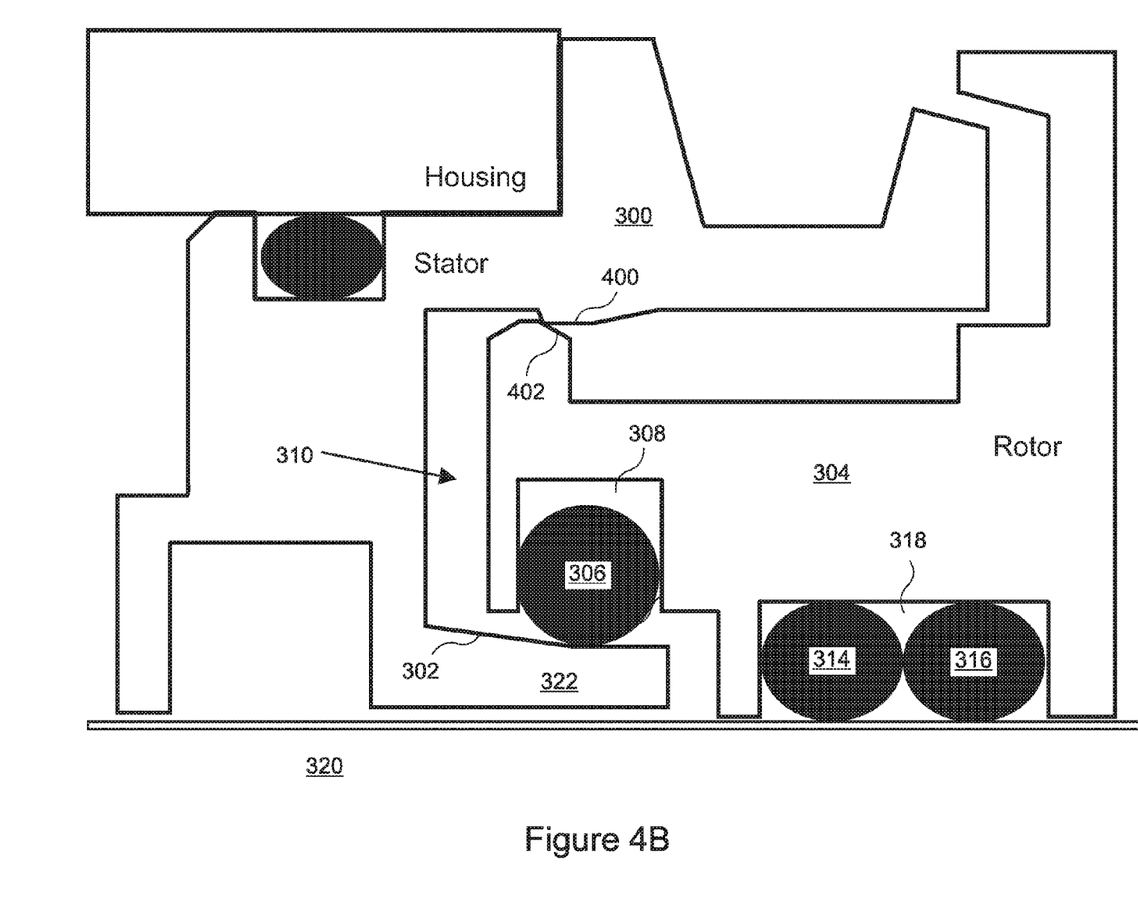
FIG. 4B is a cross-sectional view of the embodiment of FIG. 4A, shown with an axial misalignment equal to the maximum permitted misalignment.

FIG. 4B is a cross-sectional illustration of the embodiment of FIG. 4A, shown with the rotor positioned at its maximum permitted axial misalignment. It can be seen in the figure that the groove 402 and notch 400 of the unitization feature have come into contact with each other, such that the ingress of contaminants is further inhibited, and such that further axial movement of the rotor 304 is prevented.

It can also be seen in FIG. 4B that, although the axial overlap of the rotor 304 with the stator 300 is reduced as the rotor 304 shifts axially away from the stator 300 during operation, the radial clearance 312 remains unchanged.

Figure 4C:
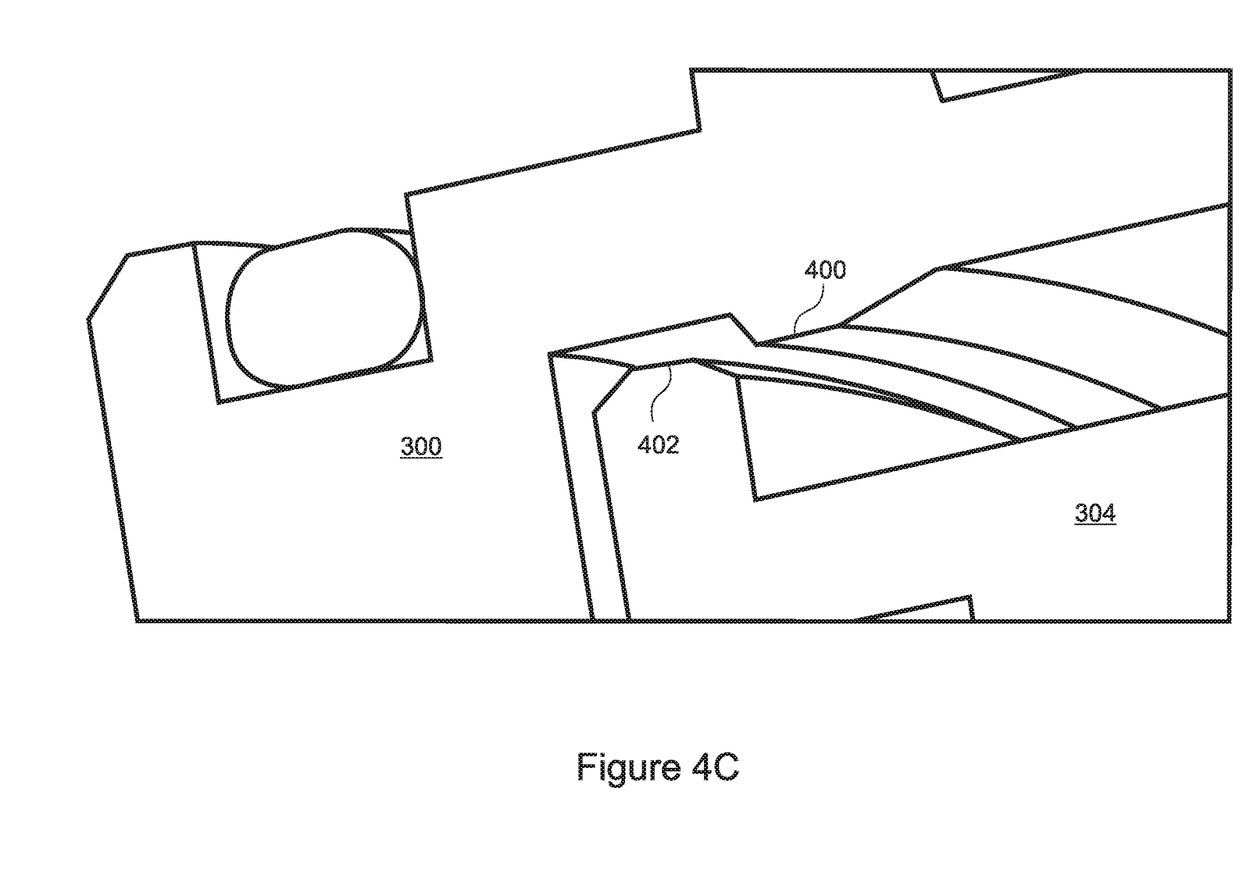
FIG. 4C is a perspective view of a portion of the stator of FIG. 4A, showing a contour of the unitization feature.

FIG. 4C is a perspective sectional illustration of the unitization feature of FIG. 4A.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

We claim:

1. A bearing isolator seal comprising:
   a rotor surrounding a rotatable shaft, said rotatable shaft being configured to rotate about a rotation axis;
   a drive retention groove formed in an inward facing surface of the rotor abutting the shaft;
   a plurality of drive O-rings contained in the drive retention groove and compressed between the shaft and a top of the drive retention groove, the drive O-rings thereby rotationally coupling the rotor to the shaft; and
   a stator surrounding the shaft and configured to remain stationary when the rotor is rotating, the rotor and stator being configured to inhibit a flow of fluid between them.

2. The bearing isolator seal of claim 1, wherein a maximum permitted axial movement is at least 0.010 inches.

3. The bearing isolator seal of claim 1, further comprising a labyrinth passage between the rotor and the stator, the labyrinth passage being configured to expel at least one of fluid and particles from the labyrinth passage by centrifugal force when the rotor is rotating.

4. The bearing isolator seal of claim 1, further comprising:
   a shut off retention groove formed in an inward-facing surface of the rotor abutting an extension of the stator; and
   a shut off O-ring expandably located within the shut off retention groove and configured to rotate with the rotor, the shut off O-ring having an inner diameter that contracts against the stator extension when the rotor is stationary, and expands away from contact with the stator extension when the rotor is rotating.

5. The bearing isolator of claim 1, wherein the stator extension includes a tapered section that is configured such that interference between the tapered section and the shut off O-ring declines linearly as the rotor moves axially away from the stator.

6. The bearing isolator seal of claim 5, wherein the tapered section is tapered at an angle of between two degrees and thirty degrees from the rotation axis.

7. The bearing isolator seal of claim 1, further comprising a unitization feature that is configured to permit separation and combination of the rotor with the stator when sufficient force is applied, while holding the rotor and stator together during assembly of the static seal.

8. The bearing isolator seal of claim 7, wherein the unitization feature includes a chamfered rotor extension and a chamfered stator extension, the rotor and stator extensions being configured to come into contact with each other when the rotor is shifted axially to a maximum permitted axial misalignment, and to thereby inhibit further axial movement of the rotor.

9. The bearing isolator seal of claim 8, wherein the unitization feature provides an additional torturous path to further inhibit the flow of fluid between the rotor and the stator.

* * * * *